(12) United States Patent
Lee

(10) Patent No.: US 11,936,477 B2
(45) Date of Patent: Mar. 19, 2024

(54) SUB-BAND AND MULTI-BAND CODED OFDM FOR HIGH-RESOLUTION RADAR

(71) Applicant: Aura Intelligent Systems, Inc., Boston, MA (US)

(72) Inventor: Jungah Lee, Boston, MA (US)

(73) Assignee: Aura Intelligent Systems, Inc., Boston, MA (US)

( * ) Notice: Subject to any disclaimer, the term of this patent is extended or adjusted under 35 U.S.C. 154(b) by 427 days.

(21) Appl. No.: 17/310,066

(22) PCT Filed: Jan. 14, 2020

(86) PCT No.: PCT/US2020/013572
§ 371 (c)(1),
(2) Date: Jul. 14, 2021

(87) PCT Pub. No.: WO2020/150283
PCT Pub. Date: Jul. 23, 2020

(65) Prior Publication Data
US 2022/0158755 A1    May 19, 2022

Related U.S. Application Data

(60) Provisional application No. 62/792,354, filed on Jan. 14, 2019.

(51) Int. Cl.
*H04L 1/00* (2006.01)
*G01S 13/42* (2006.01)
(Continued)

(52) U.S. Cl.
CPC ............ *H04L 1/007* (2013.01); *G01S 13/42* (2013.01); *G01S 15/8909* (2013.01); *H04L 5/0007* (2013.01)

(58) Field of Classification Search
CPC ....... H04L 1/007; H04L 5/0007; G01S 13/42; G01S 15/8909
(Continued)

(56) References Cited

U.S. PATENT DOCUMENTS

2004/0141548 A1   7/2004  Shattil
2007/0165588 A1   7/2007  McCoy
(Continued)

FOREIGN PATENT DOCUMENTS

CN    106093931 A       11/2016
WO    2017207041 A1     12/2017

OTHER PUBLICATIONS

International Search Report and Written Opinion dated Feb. 18, 2020 regarding Application No. PCT/US2020/013572, 6 pages.
(Continued)

*Primary Examiner* — Obaidul Huq

(57) ABSTRACT

An advanced radio apparatus includes a set of antennas; analog circuit; digital circuit; medium access control (MAC) controller; and processor operably connected to the set of antennas, the analog circuit, the digital circuit, and the MAC controller. The processor is configured to decompose wideband waveform signals into a time-frequency waveform based on a sequence of sub-band signals; generate a time-frequency radar waveform based on the decomposed wideband waveform signals; map, based on the time-frequency radar waveform, a constant amplitude zero auto-correlation (CAZAC) sequence into orthogonal frequency division multiplexing (OFDM) sub-carriers to generate a first radar signal. A transceiver is connected to the processor and configured to transmit, to a target object via a transmit antenna of the set of antennas, the first radar signal and
(Continued)

receive, via a receive antenna of the set of antennas, a second signal that is reflected or backscattered from the target object.

20 Claims, 12 Drawing Sheets

(51) Int. Cl.
*G01S 15/89* (2006.01)
*H04L 5/00* (2006.01)

(58) Field of Classification Search
USPC .................................................. 370/203, 210
See application file for complete search history.

(56) References Cited

U.S. PATENT DOCUMENTS

| | | | |
|---|---|---|---|
| 2007/0171995 | A1 | 7/2007 | Muharemovic et al. |
| 2008/0075195 | A1 | 3/2008 | Pajukoski et al. |
| 2009/0036772 | A1 | 2/2009 | Lu |
| 2009/0219802 | A1 | 9/2009 | Han et al. |
| 2011/0064069 | A1 | 3/2011 | Lipka |
| 2011/0249548 | A1 | 10/2011 | Gaal et al. |
| 2016/0128675 | A1 | 5/2016 | Kang et al. |
| 2020/0052941 | A1* | 2/2020 | Lang ..................... G01S 7/352 |
| 2020/0124700 | A1* | 4/2020 | Bourdoux ............... H04L 5/001 |
| 2021/0208237 | A1* | 7/2021 | Ravenscroft ........ H04L 27/2626 |

OTHER PUBLICATIONS

Decision to Grant a Patent dated Sep. 14, 2021 in connection with Japanese Patent Application No. 2020-573566, 6 pages.
European Patent Office, Communication pursuant to Article 94(3) EPC dated Jun. 16, 2023 regarding Application No. 20740943.4, 6 pages.
Chinese National Intellectual Property Administration, First Office Action dated Aug. 19, 2023 regarding Application No. 202080021298.8, 8 pages.
Extended European Search Report dated Apr. 8, 2022 regarding Application No. 19819272.6, 12 pages.
Paul et al., "Survey of RF Communications and Sensing Convergence Research", IEEE Access, vol. 5, Jan. 2017, pp. 252-270.
Gutiérrez Del Arroyo et al., "SAR Imaging Using WiMAX OFDM PHY", 2011 IEEE RadarCon (RADAR), May 2011, pp. 129-134.
"Passive Coherent Locator Applications", STO-EN-SET-2443, Aug. 2017, 16 pages.
Samsung, "NR PRACH design", 3GPP TSG RAN WG1 #89, R1-1707932, May 2017, 13 pages.
Samsung, "RACH preamble design for NR", 3GPP TSG RAN WG1 #86 bis, R1-1609119, Oct. 2016, 3 pages.
NTT DOCOMO et al., "Orthogonal Pilot Channel in the Same Node B in Evolved UTRA Uplink", TSG-RAN WG1 #42bis, R1-051142, Oct. 2005, 9 pages.
Extended European Search Report dated Oct. 11, 2022 regarding Application No. 20740943.4, 9 pages.
Hu et al., "Synchronization of FBMC based on CAZAC Sequence", 2011 IEEE 2nd International Conference on Software Engineering and Service Science (ICSESS), Jul. 2011, pp. 116-119.

* cited by examiner

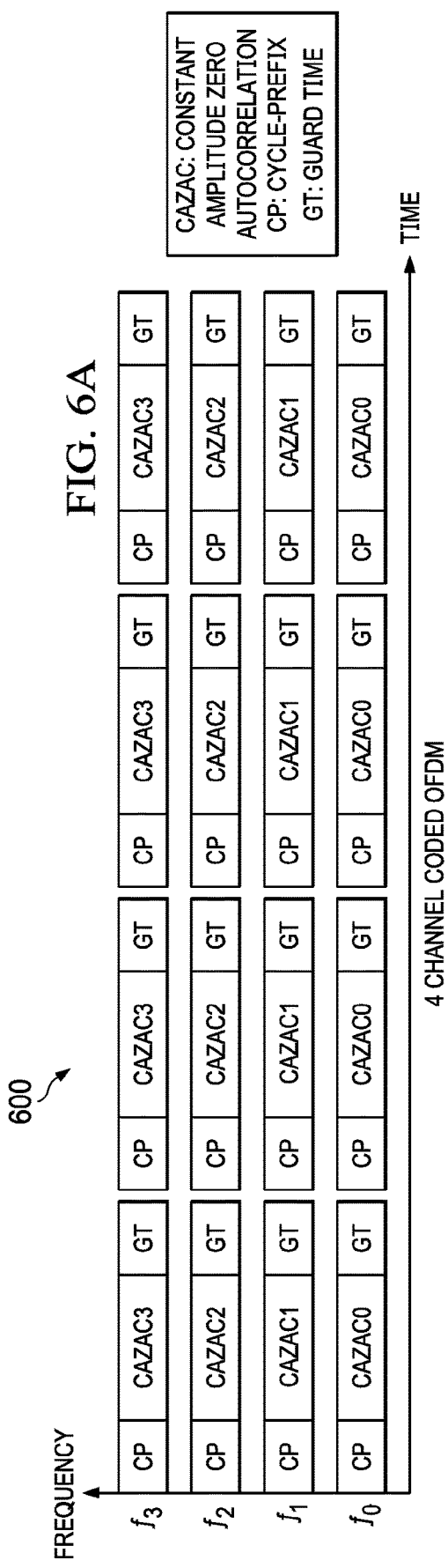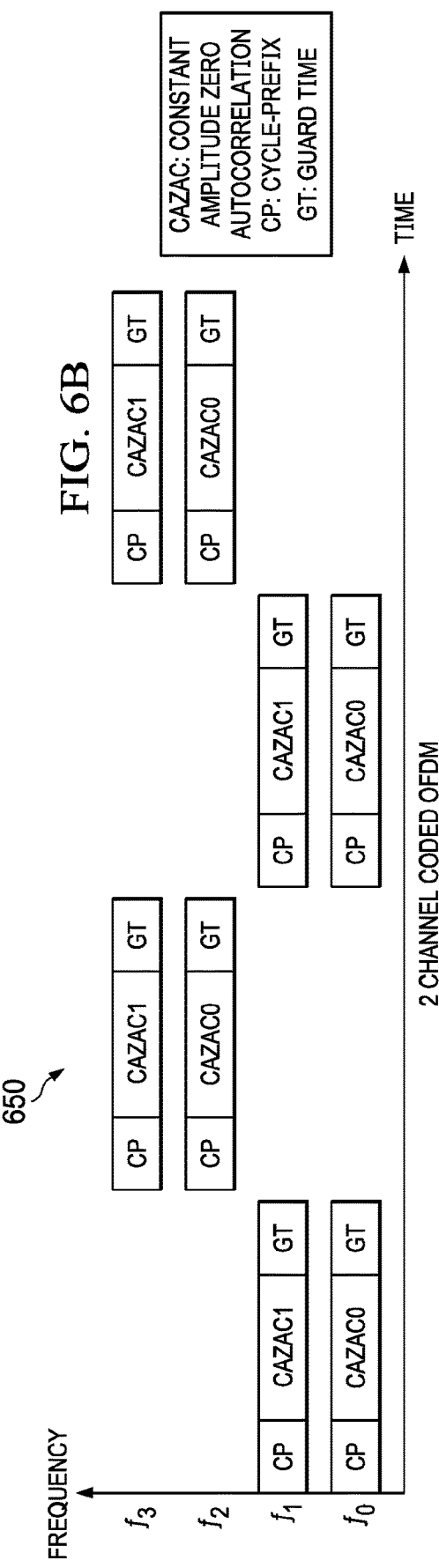

SUB-BAND AND MULTI-BAND CODED OFDM FOR HIGH-RESOLUTION RADAR

CROSS-REFERENCE TO RELATED APPLICATIONS AND CLAIM OF PRIORITY

This application is a 371 National Stage Application of International Application No. PCT/US2020/013572 filed on Jan. 14, 2020, which claims priority to U.S. Provisional Patent Application No. 62/792,354, filed on Jan. 14, 2019, the disclosures of which are herein incorporated by reference in their entirety.

TECHNICAL FIELD

This disclosure generally relates to radar system technologies. More specifically, this disclosure relates to a sub-channel and multi-channel coded OFDM with aggregation in next generation radar systems.

BACKGROUND

A design of the antenna array in a wireless communication system is one of the most important factors that provide higher performance, for example, in 3-dimensional (3D) imaging, localization, and positioning. A synthetic aperture antenna array based on multiple-input multiple-output (MIMO) employs multiple antennas to transmit and receive orthogonal waveforms. Such synthetic aperture antenna array and beamforming may be applied for radar and lidar image processing, imaging/positioning/localization for industrial automation, robotic vision, localization and positioning for communication systems, and antenna array designs for mobile devices and communication systems.

This disclosure provides new waveforms such as orthogonal frequency division multiplexing (OFDM) and code division multiple access (CDMA), MIMO antennas with analog/digital beamforming, beam and carrier assignment, 3D/4D imaging, and simultaneous communication and radar for next generation radar systems. Other technical features may be readily apparent to one skilled in the art from the following figures, descriptions, and claims.

SUMMARY

The present disclosure provides sub-band coded OFDM for high-resolution radar.

In one embodiment, an advanced radio apparatus is provided. The advanced radio apparatus comprises: a set of antennas; an analog circuit; an analog-to-digital converter (ADC) and digital-to-analog converter (DAC); a digital circuit; a medium access control (MAC) controller; a processor operably connected to the set of antennas, the analog circuit, the digital circuit, and the MAC controller, the processor configured to; decompose wideband waveform signals into a time-frequency waveform based on a sequence of sub-band signals, generate a time-frequency radar waveform based on the decomposed wideband waveform signals, map, based on the time-frequency radar waveform, a constant amplitude zero auto-correlation (CAZAC) sequence into orthogonal frequency division multiplexing (OFDM) sub-carriers to generate a first radar signal. The advanced radio apparatus further comprises a transceiver operably connected to the processor, the transceiver configured to: transmit, to a target object via a transmit antenna of the set of antennas, the first radar signal; and receive, via a receive antenna of the set of antennas, a second signal that is reflected or backscattered from the target object.

In another embodiment, a method of an advanced radio apparatus is provided. The method comprises: decomposing wideband waveform signals into a time-frequency waveform based on a sequence of sub-band signals; generating a time-frequency radar waveform based on the decomposed wideband waveform signals; mapping, based on the time-frequency radar waveform, a constant amplitude zero auto-correlation (CAZAC) sequence into orthogonal frequency division multiplexing (OFDM) sub-carriers to generate a first radar signal; transmitting, to a target object via a transmit antenna of a set of antennas, the first radar signal; and receiving, via a receive antenna of the set of antennas, a second signal that is reflected or backscattered from the target object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is made to the following description, taken in conjunction with the accompanying drawings, in which:

FIG. 6A illustrates an example 4-channel coded OFDM in accordance with the present disclosure;

FIG. 6B illustrates an example 2-channel coded OFDM in accordance with the present disclosure;

DETAILED DESCRIPTION

FIGS. 1 through 13, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
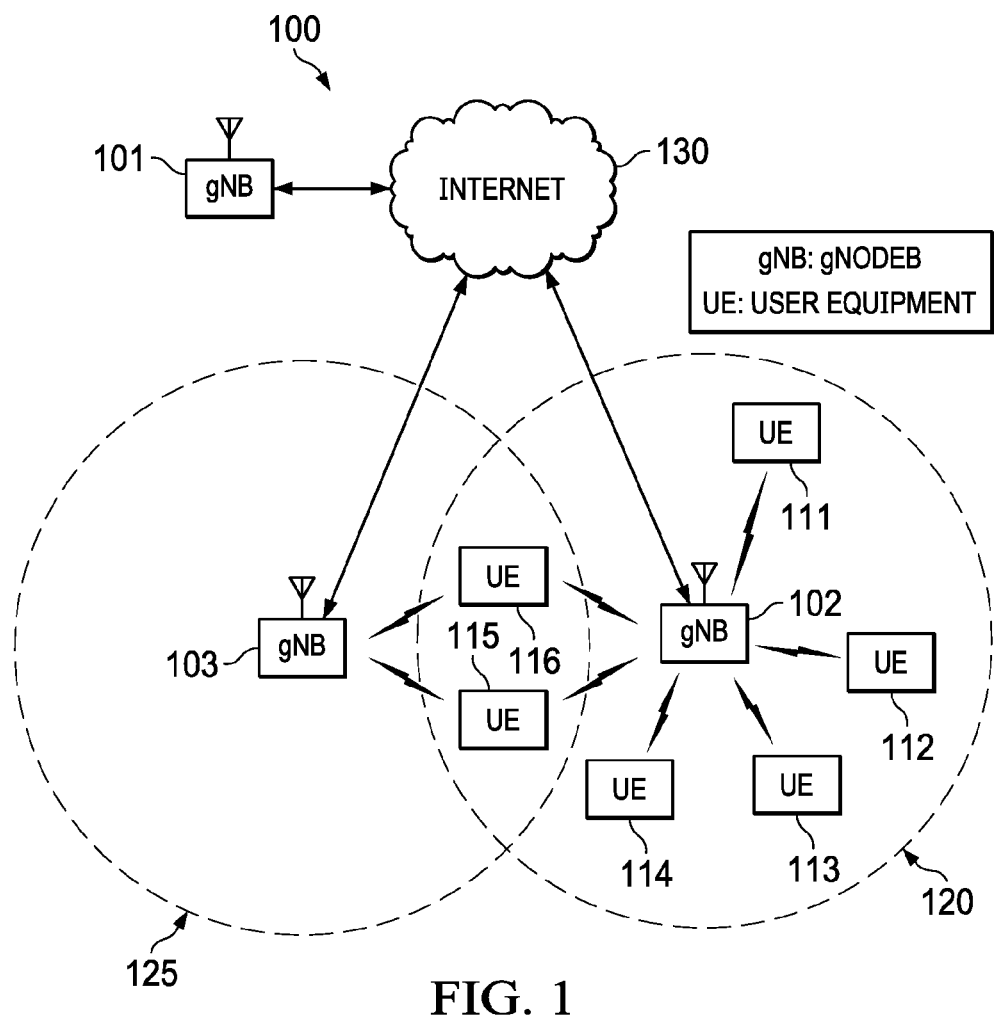
FIG. 1 illustrates an example power dissipation per transmit and receive path in a mmWave transceiver in accordance with the present disclosure.
Figure 2:
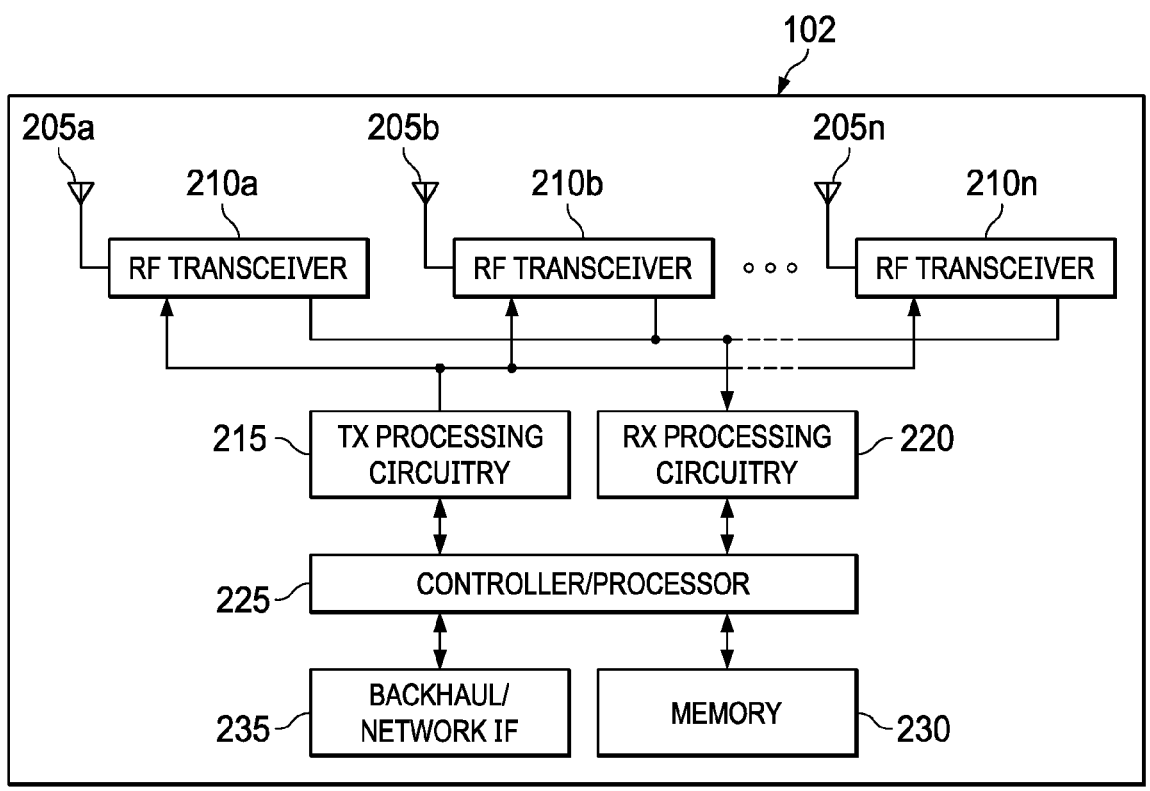
FIG. 2 illustrates an example CAZAC sequence format in accordance with the present disclosure.
Figure 3:
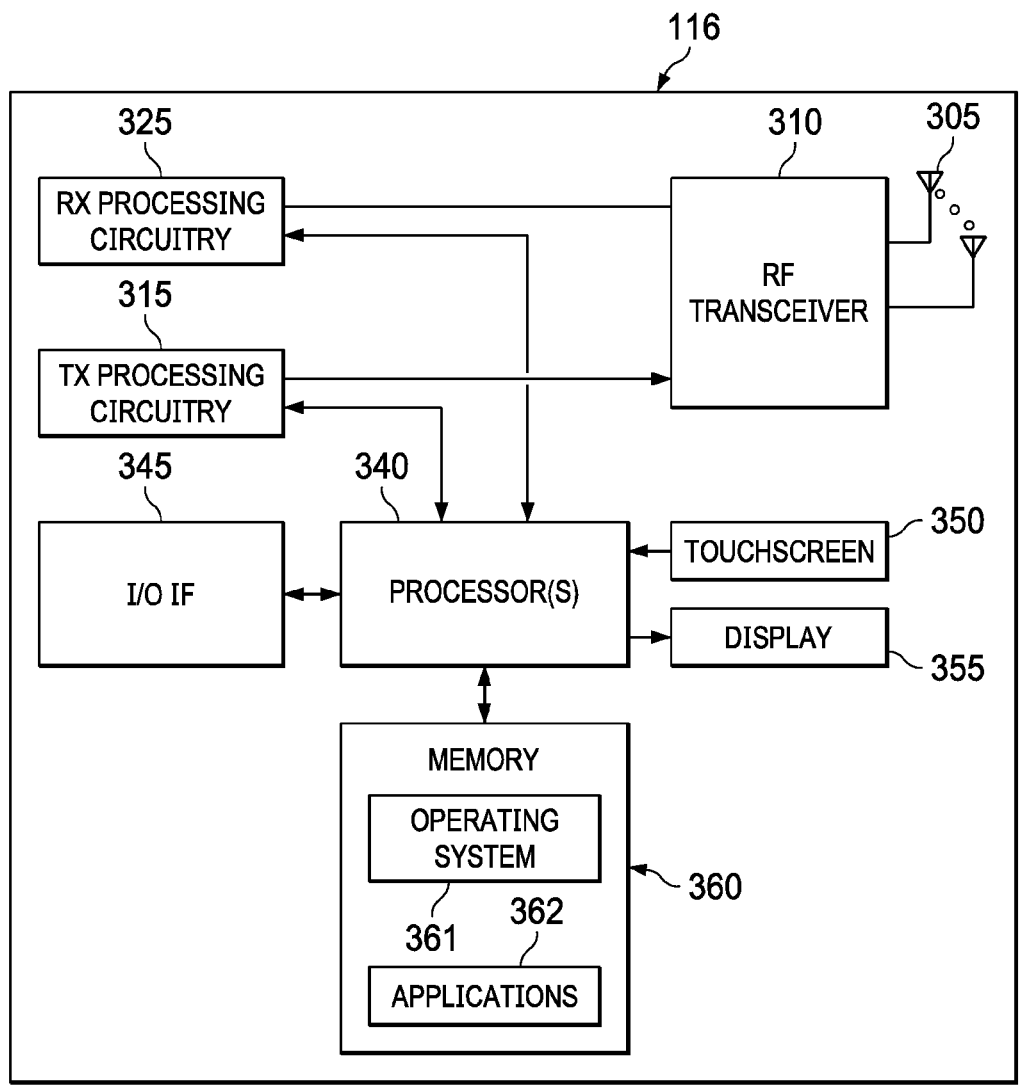
FIG. 3 illustrates an example 4 channel and 2-channel coded OFDM in accordance with the present disclosure.

FIGS. 1 through 3 describe various embodiments implemented in wireless communications systems and with the use of orthogonal frequency division multiplexing (OFDM) or orthogonal frequency division multiple access (OFDMA) communication techniques. The descriptions of FIGS. 1 through 3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only.

It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient synthetic aperture antenna array design and beamforming for 3D imaging, localization, and positioning in an advanced wireless system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The RF transceivers 210a-210n receive, from the antennas 205a-205n, incoming RF signals, such as signals reflected by UEs or any other objects in the network 100. The RF transceivers 210a-210n down-convert the incoming RF signals to generate IF or baseband signals. The IF or baseband signals are sent to the RX processing circuitry 220, which generates processed baseband signals by filtering, decoding, digitizing the baseband or IF signals and/or decompressing or correlating. The RX processing circuitry 220 sends the processed baseband signals to the controller/processor 225 for further processing.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, the ground station (e.g., access point) could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

An advanced communication apparatus may refer to a transmitter or receiver array in FIGS. 14, 15, and 16 providing hybrid beamforming operation based on all functional blocks, and may be implemented in FIG. 2 as a part of a base station (BS, gNB) or FIG. 3 as a UE.

As shown in FIG. 3, the UE 116 includes an antenna 305, a radio frequency (RF) transceiver 310, TX processing circuitry 315, and receive (RX) processing circuitry 325. The UE 116 also includes a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal and/or decompressing or correlating. The RX processing circuitry 325 transmits the processed baseband signal to the processor 340 for further processing (such as for web browsing data).

The TX processing circuitry 315 receives outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

It is well known that despite its simplicity, code division multiple access (CDMA) system suffers interference and multi-path dispersion.

Benefit of orthogonal frequency division multiplexing (OFDM) over frequency modulated continuous-wave (FMCW) radars is well understood: the waveform is simple to generate, reducing the transceiver complexity compared with FMCW and Chirp sequence modulation; waveform does not require linear frequency generation in hardware; unlike phase modulated signals, which are susceptible to self-interference and multi-path interference, OFDM waveform does not have stringent phase noise requirements, nor does it suffer from multi-path interference; and OFDM is ideally suited for MIMO processing.

Despite the benefits, OFDM signal generation and processing for a high-resolution radar is challenging due to the wide bandwidth processing required for high-resolution radars. Automotive radars in 76 GHz-81 GHz has signal bandwidth of 1 GHz to 5 GHz, requiring analog-to-digital converting (ADC) rate exceeding 10 Gsps with large number of bits. For 3D radar imaging requiring 10's to 100's channels, wideband OFDM radar systems are cost-prohibitive. As such, commercially available radar transceivers rely on FMCW signal.

In one example, power consumption is considered. Power consumption analysis of state-of-art mmWave OFDM system is shown in FIGS. 4A and 4B.

Figure 4A:
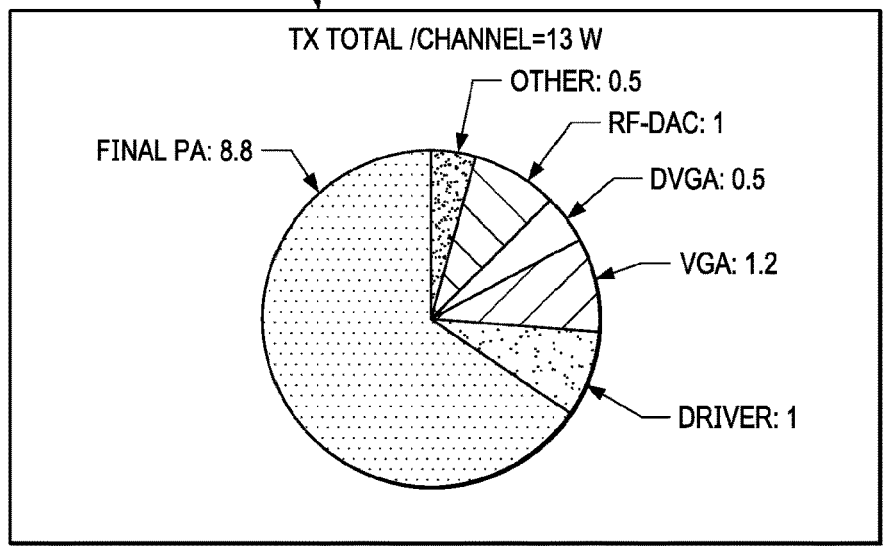
FIGS. 4A and 4B illustrate example power dissipation of mmWave transceiver per transmit and receive path in accordance with the present disclosure.
Figure 4B:
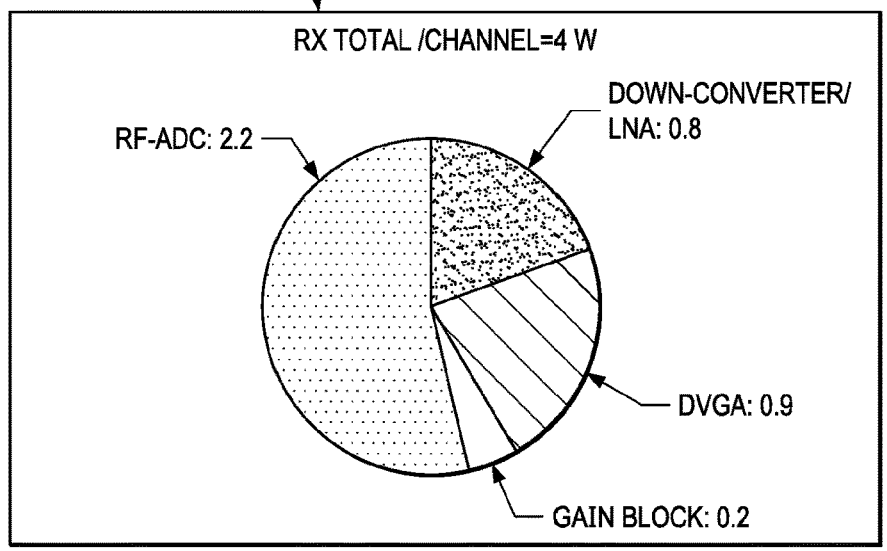

FIGS. 4A and 4B illustrate an example power dissipation of mmWave transceiver per transmit and receive path 400 in accordance with the present disclosure. The embodiment of the power dissipation of mmWave transceiver per transmit and receive path 400 illustrated in FIGS. 4A and 4B is for illustration only. FIGS. 4A and 4B do not limit the scope of this disclosure to any particular implementation.

As illustrated in FIGS. 4A and 4B, a power amplifier (PA) and radio frequency-ADC (RF-ADC) account for 67% and 55% of power dissipation in transmit and receive paths, respectively. Low-power PA and simpler ADC design is critical in transceiver design.

In one embodiment, a sub-channel coded OFDM with aggregation retaining the performance benefits of the wideband OFDM system is provided, while reducing the complexity associated with wide bandwidth signal, with low-power PA.

Compared with FMCW or chirp-sequence radars, a sub-channel phase-coded OFDM system with aggregation includes the following performance advantage: unlike FMCW system range-Doppler ambiguity, the sub-channel phase-coded OFDM system with aggregation can independently estimate range and Doppler; interference suppression by sequence coding; no need to generate highly linear frequency sweep in FMCW by analog circuitry; fast frequency ramp compared with FMCW; multiple sub-channels can be realized in time or frequency, allowing flexible design tradeoff between hardware complexity and acquisition time; flexible MIMO/beamforming design; and massive MIMO/BF gain allows systems with low-power PA, resulting in low-cost, scalable implementation with a complementary metal-oxide-semiconductor (CMOS) design that can be integrated with baseband circuitry.

Figure 5:
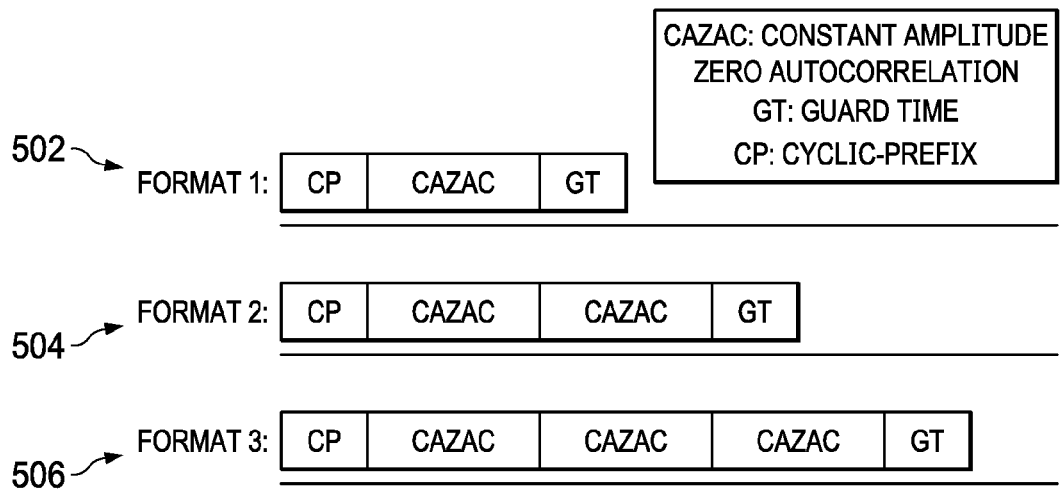
FIG. 5 illustrates an example CAZAC sequence format in accordance with the present disclosure.

FIG. 5 illustrates an example CAZAC sequence format 500 in accordance with the present disclosure. The embodiment of the CAZAC sequence format 500 illustrated in FIG. 5 is for illustration only. FIG. 5 does not limit the scope of this disclosure to any particular implementation.

In one embodiment, the CAZAC sequence format 500 may be used by a transmitter that is an electronic device. In one embodiment, the electron device may be a base station (e.g., 101-103 as illustrated in FIG. 1) or a UE (e.g., 111-116 as illustrated in FIG. 1).

As illustrated in FIG. 5, the signal structure may be a reference signal. A reference signal is composed of cyclic prefix (CP), CAZAC sequence, and guard time (GT). The GT is added depending on the required sequence length, and the range of interest for the target scene. As illustrated in FIG. 5, in a Format 1, only one sequence period is shown. When targeting longer range, or in operations involving inclement weather conditions, where high signal degradation is expected, repeated sequence may be used such as Formats 2 and 3 as illustrated in FIG. 5. With the Format 1, the SINR at the receiver may be doubled, while in the Format 3, the SINR is quadrupled. The time unit occupied by the reference signal is called "slot."

A polyphase sequence is generated from Zadoff-Chu sequences with a zero-correlation zone, generated from one or several root Zadoff-Chu sequences. Each radar unit is configured with a set of sequences that is allowed to use. For example, there are up to two sets of 64 sequences available in a root sequence. Each radar unit randomly chooses the sequence from the set at the time of transmission. Sequence hopping may be used to randomize the interference. A Zadoff-Chu sequence or binary sequences such as m-sequence can be used. Zadoff-Chu sequence is ideally suited for OFDM design due to constant envelope property of the signal in both frequency and time domains.

The $u^{th}$ root Zadoff-Chu sequence is defined by:

$$x_u(n) = e^{-j\frac{\pi u n(n+1)}{N_{ZC}}},$$

$0 \leq n \leq N_{ZC}-1$ where the length $N_{ZC}$ of the Zadoff-Chu sequence is given by TABLE 1.

From the $u^{th}$ root Zadoff-Chu sequence, the polyphase sequence with zero correlation zones of length $N_{CS}-1$ is defined by cyclic shifts according to $x_{u,v}(n) = x_u((n+C_v) \mod N_{ZC})$.

The parameter $N_{CS}$ value is selected from the set described in TABLE 1.

TABLE 1

| Sequence Configuration | $N_{CS}$ value for polyphase sequence generation | | |
|---|---|---|---|
| | Unrestricted Set | Set A | Set B |
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |

TABLE 1-continued

| Sequence Configuration | $N_{CS}$ value for polyphase sequence generation | | |
|---|---|---|---|
| | Unrestricted Set | Set A | Set B |
| 14 | 279 | 237 | — |
| 15 | 419 | — | — |

A coded OFDM signal is constructed by encoding each sub-carrier with the polyphase sequence, which is Zadoff-Chu CAZAC sequence in the present disclosure. Each coded OFDM signal occupies time-frequency resource called slot and sub-channel Each time-frequency resource can be interpreted as a sub-band. In each sub-band, the same or mutually orthogonal CAZAC sequences may be used. Other sequences such as Generalized Chirp-Like (GCL) sequence may be used to generate a set of CAZAC sequences.

Multi-channel coded OFDM signal is generated by sending the reference signal in multiple carriers. For a 79 GHz automotive radar with 4 GHz bandwidth, the channel may comprise 10 sub-channels (e.g., carriers) starting from 77.2 GHz as a center frequency and separated by 400 MHz spacing. The carrier bandwidth may be 100 MHz/200 MHz/400 MHz/500 MHz, resulting in 40/20/10/8 sub-channels, comprising a 4 GHz wideband signal. Transmission works simultaneously for all channels.

FIG. 6A illustrates an example 4-channel coded OFDM 600 in accordance with the present disclosure. The embodiment of the 4-channel coded OFDM 600 illustrated in FIG. 6A is for illustration only. FIG. 6A does not limit the scope of this disclosure to any particular implementation.

In one embodiment, the 4-channel coded OFDM 600 may be used by a transmitter that is an electronic device. In one embodiment, the electron device may be a base station (e.g., 101-103 as illustrated in FIG. 1) or a UE (e.g., 111-116 as illustrated in FIG. 1).

FIG. 6B illustrates an example 2-channel coded OFDM 650 in accordance with the present disclosure. The embodiment of the 2-channel coded OFDM 650 illustrated in FIG. 6B is for illustration only. FIG. 6B does not limit the scope of this disclosure to any particular implementation.

In one embodiment, the 2-channel coded OFDM 650 may be used by a transmitter that is an electronic device. In one embodiment, the electron device may be a base station (e.g., 101-103 as illustrated in FIG. 1) or a UE (e.g., 111-116 as illustrated in FIG. 1).

In one embodiment, a sub-set of multiple channels may be transmitted at a time. Illustration of multi-channel coded OFDM signal is shown in FIGS. 6A and 6B. A sub-channel coded OFDM signal is generated by sending the reference signal at different sub-channels sequentially in time. The sub-channels may be generated sequentially or randomly by frequency hopping. Illustration of sub-channel coded OFDM signal is shown in FIGS. 7A and 7B.

Figure 7A:
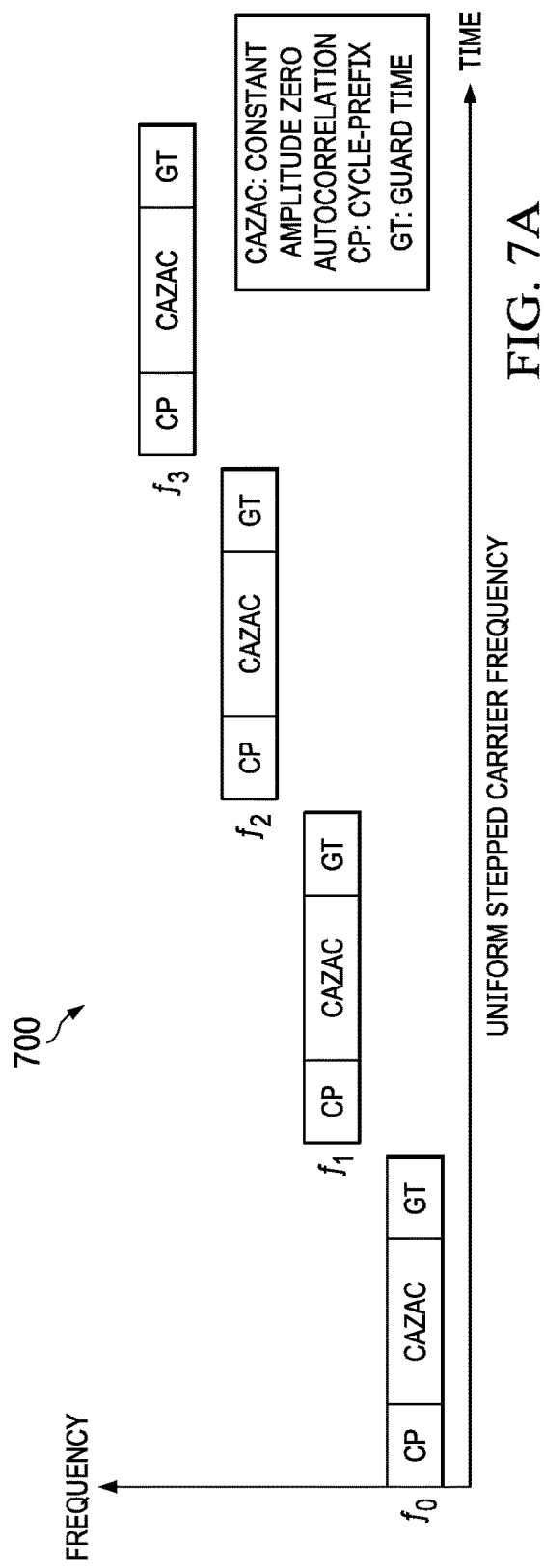
FIG. 7A illustrates an example sub-channel coded OFDM with uniform stepped carrier frequency in accordance with the present disclosure.

FIG. 7A illustrates an example sub-channel coded OFDM with uniform stepped carrier frequency 700 in accordance with the present disclosure. The embodiment of the sub-channel coded OFDM with uniform stepped carrier frequency 700 illustrated in FIG. 7A is for illustration only. FIG. 7A does not limit the scope of this disclosure to any particular implementation.

In one embodiment, the sub-channel coded OFDM with uniform stepped carrier frequency 700 may be used by a transmitter that is an electronic device. In one embodiment, the electron device may be a base station (e.g., 101-103 as illustrated in FIG. 1) or a UE (e.g., 111-116 as illustrated in FIG. 1).

Figure 7B:
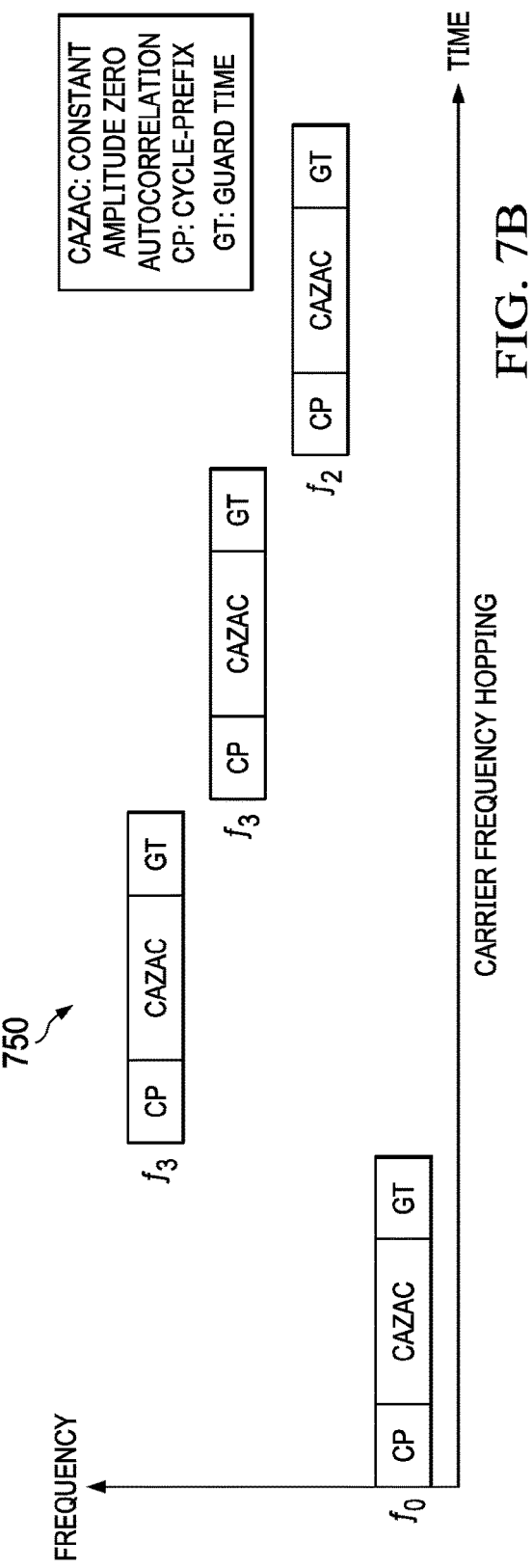
FIG. 7B illustrates an example sub-channel coded OFDM with carrier frequency hopping in accordance with the present disclosure.

FIG. 7B illustrates an example sub-channel coded OFDM with carrier frequency hopping 750 in accordance with the present disclosure. The embodiment of the sub-channel coded OFDM with carrier frequency hopping 750 illustrated in FIG. 7B is for illustration only. FIG. 7B does not limit the scope of this disclosure to any particular implementation.

In one embodiment, the sub-channel coded OFDM with carrier frequency hopping 750 may be used by a transmitter that is an electronic device. In one embodiment, the electron device may be a base station (e.g., 101-103 as illustrated in FIG. 1) or a UE (e.g., 111-116 as illustrated in FIG. 1).

Figure 8:
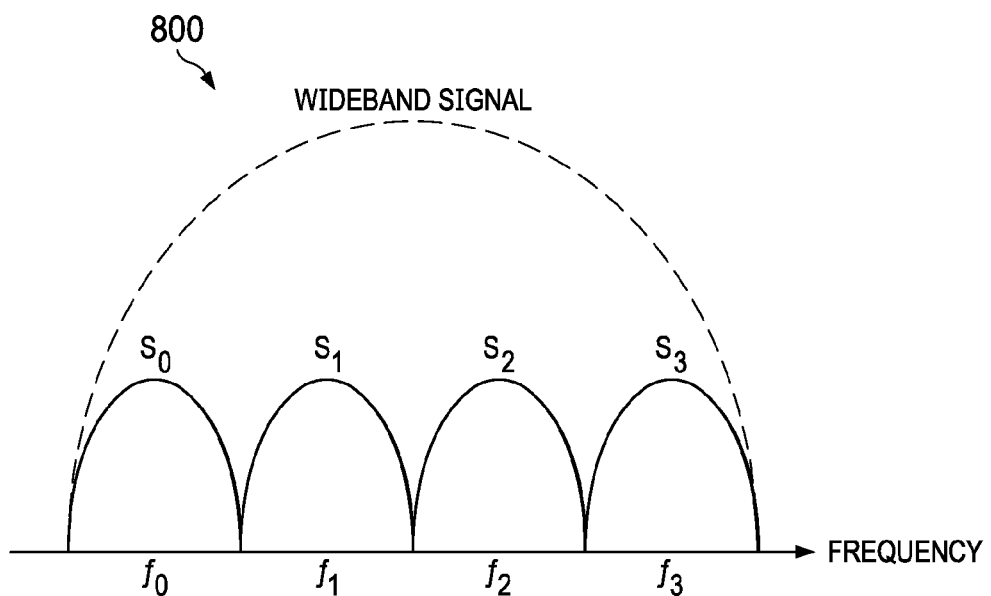
FIG. 8 illustrates an example spectrum of multi-channel coded OFDM (4-channel case) 800 in accordance with the present disclosure.

FIG. 8 illustrates an example spectrum of multi-channel coded OFDM (4-channel case) 800 in accordance with the present disclosure. The embodiment of the spectrum of multi-channel coded OFDM (4-channel case) 800 illustrated in FIG. 8 is for illustration only. FIG. 8 does not limit the scope of this disclosure to any particular implementation.

Spectrum of constructed wideband signal is shown in FIG. 8. For a multi-channel or a sub-channel OFDM signal, a signal is converted to a narrow band signal at the receiver and goes through a narrow-band (sub-band) signal processing for each path. Correlation and coherent accumulation of the resulting statistics generates statistic equivalent to wideband signal.

RADAR MAC controller is an entity assigning time-frequency resource and the code of the reference signal. Time-frequency resources are configured based on a targeted range, a transmit power, a beamforming method, and/or an interference level measured at a receiver. The frequency and the code resource hop between multiple sequences and frequency sub-bands randomly. The resource can be re-assigned semi-statically or dynamically real-time during operation.

Figure 9:
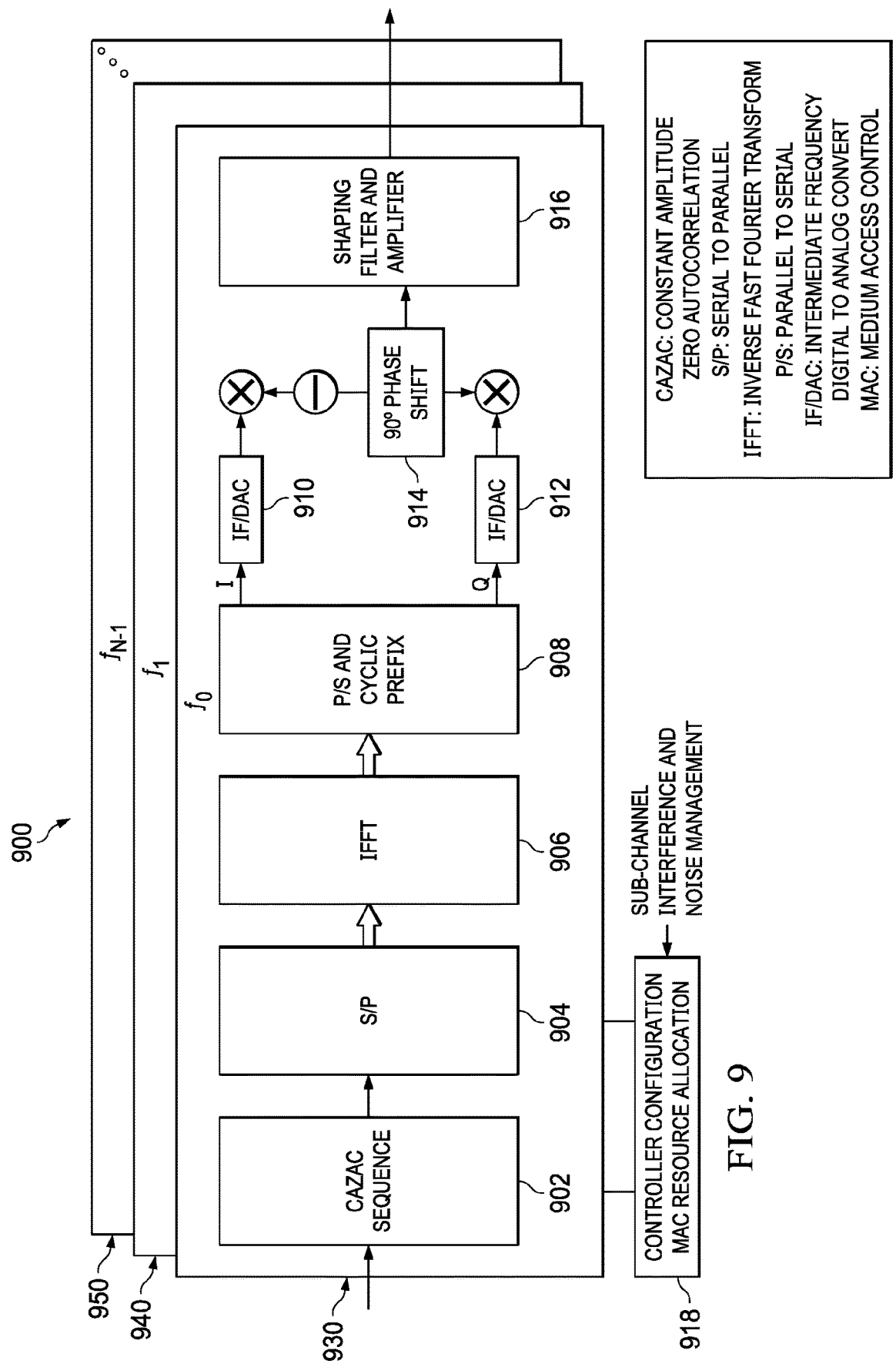
FIG. 9 illustrates an example transmitter architecture for multi-channel coded OFDM system in accordance with the present disclosure.

FIG. 9 illustrates an example transmitter architecture for multi-channel coded OFDM system 900 in accordance with the present disclosure. The embodiment of the transmitter architecture for multi-channel coded OFDM system 900 illustrated in FIG. 9 is for illustration only. FIG. 9 does not limit the scope of this disclosure to any particular implementation.

In one embodiment, the transmitter architecture for multi-channel coded OFDM system 900 may be implemented at a base station (e.g., 101-103 as illustrated in FIG. 1) or a UE (e.g., 111-116 as illustrated in FIG. 1). The embodiments in 900 generates transmit signal composed of multiple sub-band channels modulating carriers $f_0, \ldots, f_{N-1}$. A CZAC sequence 902 generates a sub-band CAZAC sequence by DFT pre-coding of a Zadoff-Chu sequence. An S/P 904 converts the serial data to parallel stream. An IFFT 906 takes the parallel pre-coded CAZAC sequence and converts the parallel stream of pre-coded CAZAC sequence to time-domain signal. A P/S and cyclic prefix 908 converts the time domain signal to serial stream and adds cyclic-prefix. Optional guard time is added. IF/DACs 910 and 912 take the in-phase and quadrature components of the output of 908 and converts them to analog data in-phase and quadrature signal. A phase shift 914 takes the output in-phase and quadrature analog signals of the outputs of 908 and 910 and modulates the carrier frequency. In block shaping filter and Amp 916, the modulated carrier is further processed by a shaping filter and amplified and sent to the antenna(s). A MAC controller 918 configures and assigns time-frequency and code resources of the transmitter.

As illustrated in FIG. 9, the circuit 930 includes all components such as 902-918 and circuits 940 and 950 may includes the same components as included in the circuit 930. In one embodiment, additional circuit may be added into the transmitter architecture for multi-channel coded OFDM system 900.

Figure 11:
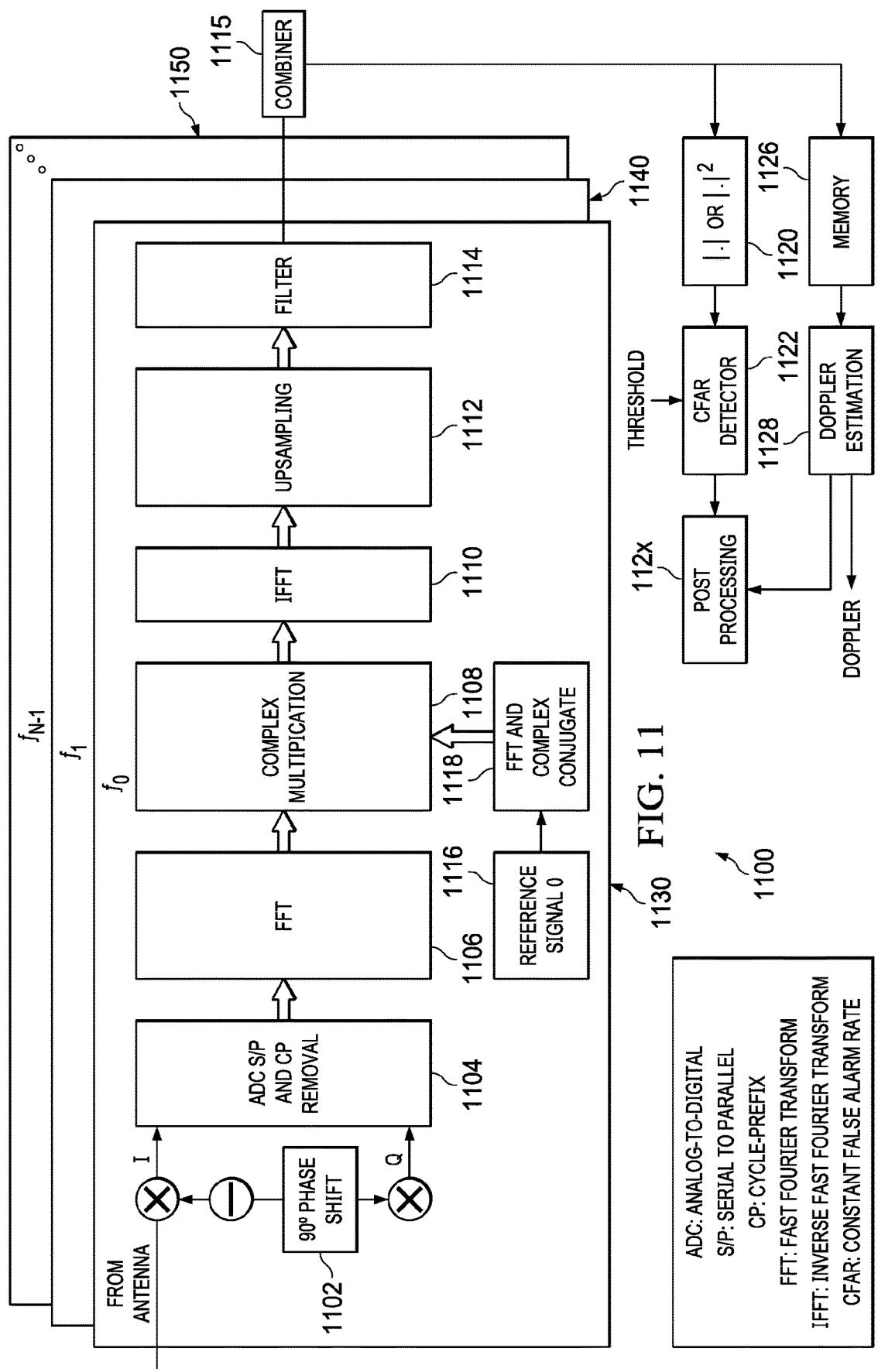
FIG. 11 illustrates an example receiver architecture for multi-channel coded OFDM radar system in accordance with the present disclosure.

As illustrated in FIG. 9 of the transmitter, the analog circuit receives the output of the DAC, modulates the carrier, amplifies and filters the signal and feeds the signal to the antenna. As illustrated in FIG. 11 of the receiver, the analog circuit receives the signal from the antenna, filters and amplifies the signal, demodulates the carrier to baseband and sends it to ADC. The DAC converts the digital baseband signal to analog signal. The analog circuit may implement analog beamforming for multiple antennas by combining power amplifier (PA), filters and phase shifters. The ADC converts the analog signal to digital signal. The digital circuit in the transmitter generates digital waveform by baseband processing algorithm from sequences and symbol modulation and multiplexing. The digital circuit in the receiver processes the baseband signal and generates output signal such as decision statistic.

Figure 10:
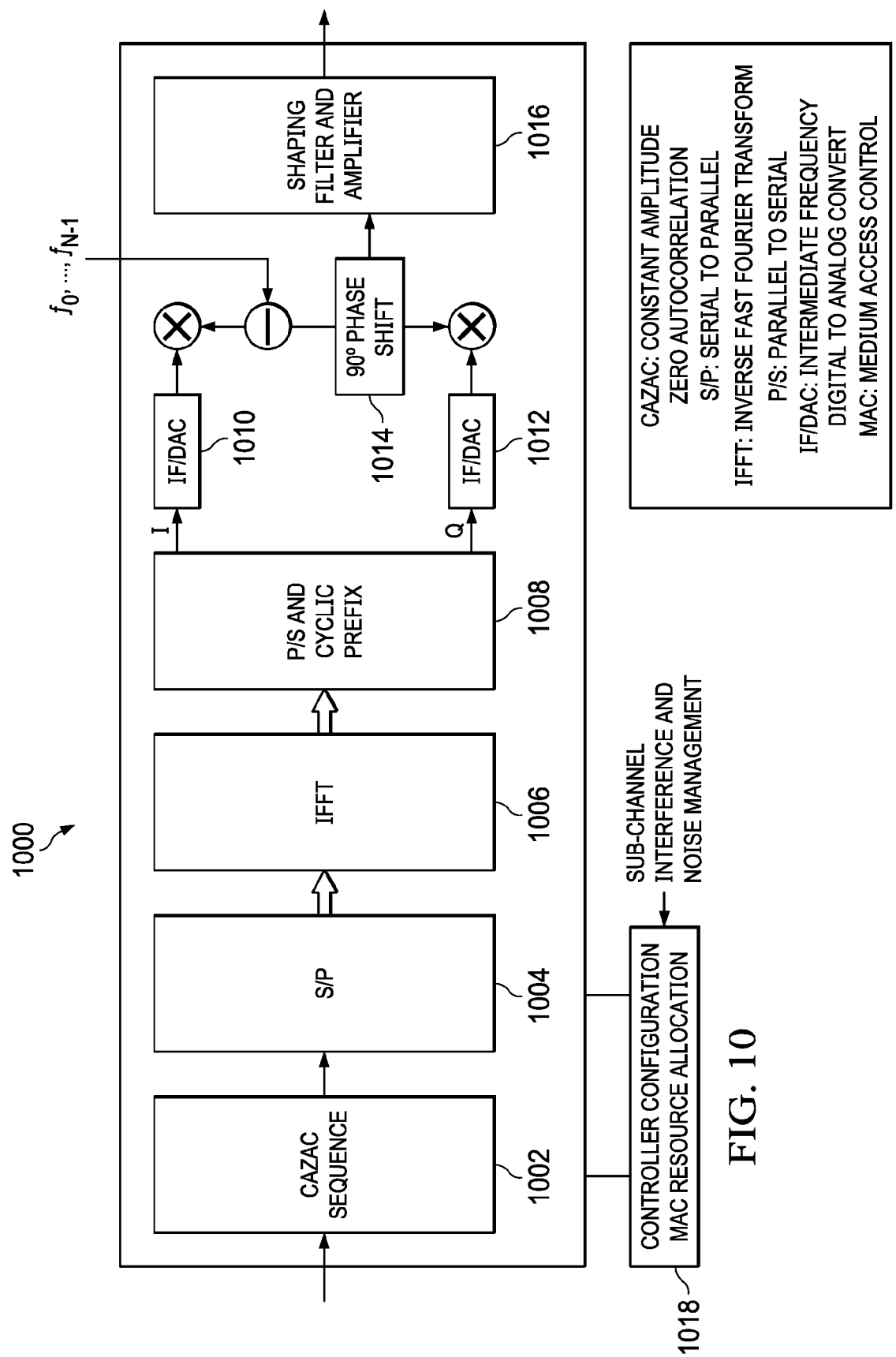
FIG. 10 illustrates an example transmitter architecture for sub-channel coded OFDM system in accordance with the present disclosure.

FIG. 10 illustrates an example transmitter architecture for sub-channel coded OFDM system 1000 in accordance with the present disclosure. As illustrated in FIG. 10, the transmitter architecture for sub-channel coded OFDM system 1000 generates transmit sub-band channel signals modulating carriers $f_0, \ldots, f_{N-1}$. The sub-band signal is generated sequentially in time. A CAZAC sequence 1002 generates a sub-band CAZAC sequence by DFT pre-coding of a Zadoff-Chu sequence. An S/P 1004 converts the serial data to parallel stream. An IFFT 1006 takes the parallel pre-coded CAZAC sequence and converts the parallel stream of pre-coded CAZAC sequence to time-domain signal. A P/S and cyclic prefix 1008 converts the time domain signal to serial stream and adds cyclic-prefix. An optional guard time is added. IF/DACs 1010 and 1012 take in-phase and quadrature components of the output of 1008 and converts them to analog data in-phase and quadrature signal. A phase shift 1014 takes the output in-phase and quadrature analog signals of the outputs of 1008 and 1010, and modulates the carrier frequency. In a shaping filter and amp 1016, the modulated carrier is further processed by shaping filter, and amplified and send to the antenna. A MAC controller 1018 configures and assigns time-frequency and code resources of the transmitter.

The embodiment of the transmitter architecture for sub-channel coded OFDM system 1000 illustrated in FIG. 10 is for illustration only. FIG. 10 does not limit the scope of this disclosure to any particular implementation.

In one embodiment, the transmitter architecture for sub-channel coded OFDM system 1000 may be implemented at a base station (e.g., 101-103 as illustrated in FIG. 1) or a UE (e.g., 111-116 as illustrated in FIG. 1).

A transmitter architecture for a sub-band coded OFDM system is shown in FIG. 9 and FIG. 10. In a multi-channel coded OFDM system, multiple instances of transmit chain are implemented and processed in parallel. In a sub-channel coded OFDM system, a coded sub-band OFDM signal is modulated with a carrier frequency corresponding to a sub-channel for each slot.

FIG. 11 illustrates an example receiver architecture for multi-channel coded OFDM radar system 1100 in accordance with the present disclosure. The embodiment of the receiver architecture for multi-channel coded OFDM radar system 1100 illustrated in FIG. 11 is for illustration only. FIG. 11 does not limit the scope of this disclosure to any particular implementation.

In one embodiment, the receiver architecture for multi-channel coded OFDM radar system 1100 may be implemented at a base station (e.g., 101-103 as illustrated in FIG. 1) or a UE (e.g., 111-116 as illustrated in FIG. 1).

A receiver architecture for a sub-band coded OFDM system is shown in FIG. 11. For each sub-band, a signal is demodulated followed by a sub-band ADC. After CP removal, a correlation is computed in a frequency domain, by taking a fast Fourier transform (FFT) of a baseband signal, multiplication with the complex conjugate of the reference signal, followed by an inverse fast Fourier transform (IFFT).

A correlation value is interpolated by up-sampling followed by a low pass filet (LPF). Each processed sub-band signal is added. Detection statistic is formed by taking the amplitude or amplitude square, followed by a constant false alarm rate (CFAR) detector. A post-processing is achieved to remove the artefacts. Also, the correlation output is stored in a memory for Doppler estimation.

In a multi-channel coded OFDM system, multiple instances of a receiver chain are implemented and processed in parallel. In a sub-channel coded OFDM system, each sub-channel output is accumulated over time for detection and post-processing.

As illustrated in FIG. 11, a phase shift 1102 and ADC S/P and CP removal 1114 describe sub-band signal processing. The phase shift 1102, received signal from the antenna is demodulated to generate in-phase and quadrature components of the analog signal. In ADC S/P and CP removal 1104, the analog signal is converted to digital signal by ADC, converted to parallel stream by serial-to-parallel (S/P) converter, and cyclic-prefix is removed. In FFT 1106, the output of 1104 is further converted to frequency domain signal by FFT. In complex multiplication 1108, output signal of the IFT 1106 is multiplied by complex conjugate 1118 of the transmitted reference signal 1116. In IFFT 1110, the output of the complex multiplication 1108 is converted to time-domain signal by IFFT. The signal is upsampled in an up-sampling 1112 and filtered in a filter 1114.

The embodiment 1120 takes amplitude or amplitude square. The embodiment 1122 applies threshold according to CFAR criterion for detection of the result.

The embodiment 1126 stores the combiner output in memory over multiple symbols. The embodiment 1128 processes stored symbols and estimates Doppler.

In 1124, the detected result and Doppler processed signal is further processed in post processing.

In one embodiment, the combiner 1115 combines the output signals of 1114 in the circuit 1130 with the output signals of circuit 1140 and 1150 in order to generate a wideband correlation output. The circuit 1140 and 1150 may include the same or similar component of the circuit 1130 including 1102 to 1114.

In one embodiment, an additional circuit or circuits may be added and combined with the output signals of the circuit 1130, 1140, and 1150.

A waveform for each sub-channel can be a filter-bank multi-carrier (FBMC) or a single-carrier (SC) without changing the overall architecture of the system. A sub-band OFDM signal can be a cyclic-prefix free signal.

A radar system can be built as a 3D radar for range, angle-of-arrival, and Doppler estimation or 4D imaging radar for Azimuth, elevation, range and Doppler images.

Figure 12:
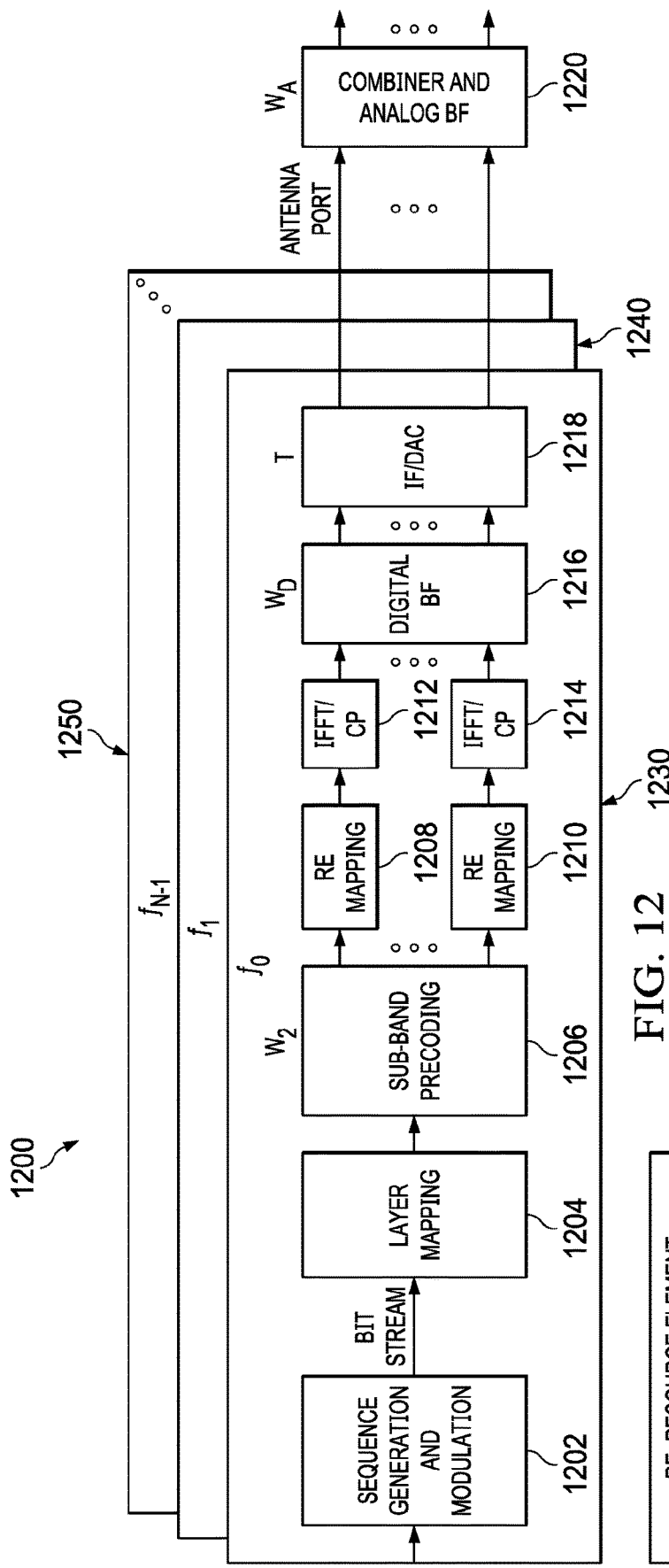
FIG. 12 illustrates an example hybrid beamforming architecture at the transmitter in accordance with the present disclosure.

FIG. 12 illustrates an example hybrid beamforming architecture at the transmitter 1200 in accordance with the present disclosure. The embodiment of the hybrid beamforming architecture at the transmitter 1200 illustrated in FIG. 12 is for illustration only. FIG. 12 does not limit the scope of this disclosure to any particular implementation.

In one embodiment, the hybrid beamforming architecture at the transmitter 1200 may be implemented at a base station (e.g., 101-103 as illustrated in FIG. 1) or a UE (e.g., 111-116 as illustrated in FIG. 1).

As illustrated in FIG. 12, a digital beamforming is applied after IFFT, followed by an analog beamforming. In a multi-channel architecture, a digital beamforming is applied for each sub-band while analog beamforming is applied for the entire bandwidth, after combining multiple sub-bands. In a sub-channel architecture, both digital beamforming and analog beamforming may be applied for a sub-band. Receiver processing is applied per band and per antenna path.

As illustrated in FIG. 12, in sequence generation and modulation 1202, one or multiple MIMO sequences are generated from CAZAC sequence. In a layer mapping 1204, the sequences are mapped to MIMO layers. In sub-band precoding 1206, each layer of the MIMO coding is applied to the MIMO layer sub-band signals with a Walsh-Hadamard code or a DFT code. In RE mappings 1208 and 1210, the sequences are mapped to frequency domain by resource element (RE) mapping for each of the MIMO layers. In IFFT/CPs 1212 and 1214, the RE mapped signal for each MIMO layer is transformed to time-domain by IFFT and cyclic prefix is added to the domain signal. A digital BF 1216 performs digital beamforming by applying time-domain beamforming weights to the time-domain signal. In an IF/DAC 1218, the output of 1216 is converted to analog signal by IF and ADC. In a combiner and analog BF 1220, the output signals of 1218 of the circuit 1230 is combined with the output signals of circuit 1240 and 1250. The circuit 1240 and 1250 may include the same or similar component of the circuit 1230 including 1202 to 1220. In one embodiment, and further processed with analog beamformer.

In one embodiment, additional circuit may be added and combined with the output signals of the circuit 1230, 1240, and 1250.

In one embodiment, the hybrid beamforming architecture at the transmitter 1200 further processes with analog beamforming.

As illustrated in FIG. 12, beam (spatial), a sub-band (frequency), and a slot (time) can be selected independently, resulting in improvement in an acquisition time while avoiding interference.

Figure 13:
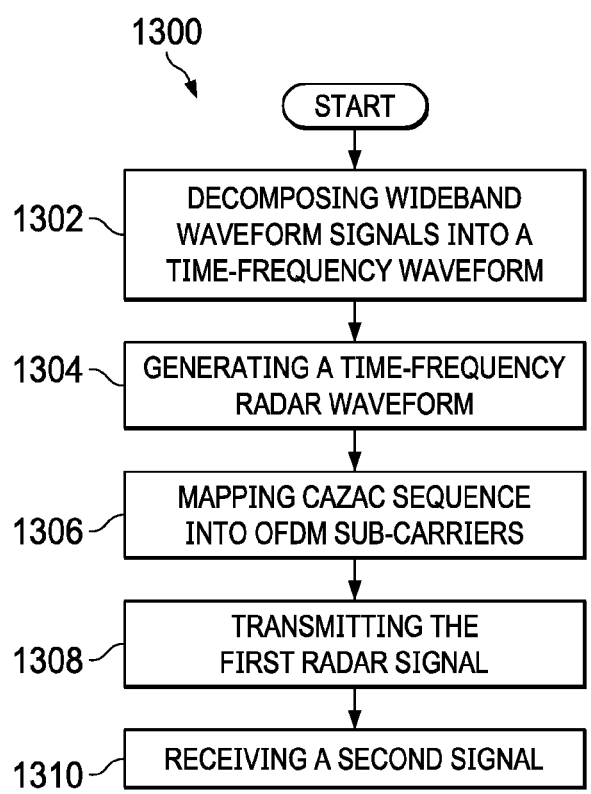
FIG. 13 illustrates a flow chart of a method for sub-band coded OFDM for high-resolution radar in accordance with the present disclosure.

FIG. 13 illustrates a flow chart of a method 1300 for sub-band coded OFDM for high-resolution radar in accordance with the present disclosure, as may be performed by an advanced radio apparatus (e.g., 101-103 as illustrated in FIG. 1) or a UE (e.g., 111-116 as illustrated in FIG. 1). The embodiment of the method 1300 illustrated in FIG. 13 is for illustration only. FIG. 13 does not limit the scope of this disclosure to any particular implementation.

In one embodiment, the method 1300 may be performed by a stand-alone radar system that is implemented at a vehicle, a portable electronic device, a fixed electronic device, and any type of electronic devices.

As shown in FIG. 13, the method 1300 begins at step 1302.

In step 1302, the advanced radar apparatus decomposes wideband waveform signals into a time-frequency waveform based on a sequence of sub-band signals.

In one embodiment, the time-frequency radar waveform is an OFDM, a filter bank multi-carrier (FBMC), or a DFT pre-coded single carrier waveform.

Subsequently, in step 1304, the advanced radar apparatus generates a time-frequency radar waveform based on the decomposed wideband waveform signals;

Subsequently, in step 1306, the advanced radar apparatus maps, based on the time-frequency radar waveform, a constant amplitude zero auto-correlation (CAZAC) sequence into orthogonal frequency division multiplexing (OFDM) sub-carriers to generate a first radar signal;

Next, in step 1308, the advanced radar apparatus transmits, to a target object via a transmit antenna of a set of antennas, the first radar signal.

Finally, in step 1310, the advanced radar apparatus receives, via a receive antenna of the set of antennas, a second signal that is reflected or backscattered from the target object.

In one embodiment, the advanced radar apparatus decomposes wideband waveform signals into a time-frequency waveform based on multiple sub-band signals.

In one embodiment, the advanced radar apparatus generates the CAZAC sequence using a discrete Fourier transform (DFT) pre-coding based on a time-domain CAZAC sequence.

In one embodiment, the advanced radar apparatus performs at least one of a sequence hopping of the CAZAC sequence or a frequency hopping in time.

In one embodiment, the advanced radar apparatus assigns time-frequency resources for the first radar signal based on a set of sequences, a time, a frequency pattern, a power, a hopping pattern, a beamforming and interference configuration of reference signal; and re-assigns the time-frequency resources in a semi-static mode or a dynamic mode.

In one embodiment, the advanced radar apparatus determines each sub-band of the sub-band signals and applies multiple digital beamforming for each sub-band of the sub-band signals and a single analog beamforming for all sub-band of the sub-band signals.

In one embodiment, the advanced radar apparatus: determines each of the sub-band signals based on the first radar signal and the second signal; obtains a third signal by processing each of the sub-band signals in a frequency domain; aggregates each of the sub-band signals based on the third signals; and generates a correlation output in a time domain based on the aggregated each of the sub-band signals.

In such embodiment, each of the sub-band signals is accumulated over a time for detection using an amplitude or an amplitude square and a post-processing to remove artefacts, and the correlation output is stored in a memory.

In one embodiment, the advanced radar apparatus transmits and receives signals, via an antenna system, a transmitter, a receiver, and a communication processor operably connected to the transmitter, the receiver, and the antenna system, using at least one of optical systems, wireless communication protocols or wired communication protocols.

In some embodiments, various functions described in the present disclosure are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An advanced radio apparatus, comprising:
a set of antennas;
an analog circuit;
a digital circuit;
a medium access control (MAC) controller;
a processor operably connected to the set of antennas, the analog circuit, the digital circuit, and the MAC controller, the processor configured to:
  decompose wideband waveform signals into a time-frequency waveform based on a sequence of sub-band signals;
  generate a time-frequency radar waveform based on the decomposed wideband waveform signals; and
  map, based on the time-frequency radar waveform, a constant amplitude zero auto-correlation (CAZAC) sequence into orthogonal frequency division multiplexing (OFDM) sub-carriers to generate a first radar signal; and
a transceiver operably connected to the processor, the transceiver configured to:
  transmit, to a target object via a transmit antenna of the set of antennas, the first radar signal; and
  receive, via a receive antenna of the set of antennas, a second signal that is reflected or backscattered from the target object.

2. The advanced radio apparatus of claim 1, wherein the processor is further configured to decompose wideband waveform signals into a time-frequency waveform based on multiple narrowband signals.

3. The advanced radio apparatus of claim 1, wherein the processor is further configured to generate the CAZAC sequence using a discrete Fourier transform (DFT) pre-coding based on a time-domain CAZAC sequence.

4. The advanced radio apparatus of claim 1, wherein the processor is further configured to perform at least one of a sequence hopping of the CAZAC sequence or a frequency hopping in time.

5. The advanced radio apparatus of claim 1, wherein the MAC controller is configured to:
assign time-frequency resources for the first radar signal based on a set of sequences, a time, a frequency pattern, a power, a hopping pattern, a beamforming and interference configuration of reference signal; and
re-assign the time-frequency resources in a semi-static mode or a dynamic mode.

6. The advanced radio apparatus of claim 1, wherein the processor is further configured to:
determine each sub-band of the sub-band signals; and
apply multiple digital beamforming for each sub-band of the sub-band signals and a single analog beamforming for all sub-band of the sub-band signals.

7. The advanced radio apparatus of claim 1, wherein the processor is further configured to:
determine each of the sub-band signals based on the first radar signal and the second signal;
obtain a third signal by processing each of the sub-band signals in a frequency domain;
aggregate each of the sub-band signals based on the third signals; and
generate a correlation output in a time domain based on the aggregated each of the sub-band signals.

8. The advanced radio apparatus of claim 7, wherein:
each of the sub-band signals is accumulated over a time for detection using an amplitude or an amplitude square and a post-processing to remove artefacts; and
the correlation output is stored in a memory that is operably connected to the processor.

9. The advanced radio apparatus of claim 1, wherein the time-frequency radar waveform is an OFDM, a filter bank multi-carrier (FBMC), or a DFT pre-coded single carrier waveform.

10. The advanced radio apparatus of claim 1, wherein:
the advanced radio apparatus further comprises a communication system including an antenna system, a transmitter, a receiver, and a communication processor operably connected to the transmitter, the receiver, and the antenna system; and
the communication system transmits and receives signals using at least one of optical systems, wireless communication protocols or wired communication protocols.

11. A method of an advanced radio apparatus, the method comprising:
decomposing wideband waveform signals into a time-frequency waveform based on a sequence of sub-band signals;
generating a time-frequency radar waveform based on the decomposed wideband waveform signals;
mapping, based on the time-frequency radar waveform, a constant amplitude zero auto-correlation (CAZAC) sequence into orthogonal frequency division multiplexing (OFDM) sub-carriers to generate a first radar signal;
transmitting, to a target object via a transmit antenna of a set of antennas, the first radar signal; and
receiving, via a receive antenna of the set of antennas, a second signal that is reflected or backscattered from the target object.

12. The method of claim 11, further comprising decomposing wideband waveform signals into a time-frequency waveform based on multiple narrowband signals.

13. The method of claim 11, further comprising generating the CAZAC sequence using a discrete Fourier transform (DFT) pre-coding based on a time-domain CAZAC sequence.

14. The method of claim 11, further comprising performing at least one of a sequence hopping of the CAZAC sequence or a frequency hopping in time.

15. The method of claim 11, further comprising:
assigning time-frequency resources for the first radar signal based on a set of sequences, a time, a frequency pattern, a power, a hopping pattern, a beamforming and interference configuration of reference signal; and
re-assigning the time-frequency resources in a semi-static mode or a dynamic mode.

16. The method of claim 11, further comprising:
determining each sub-band of the sub-band signals; and
applying multiple digital beamforming for each sub-band of the sub-band signals and a single analog beamforming for all sub-band of the sub-band signals.

17. The method of claim 11, further comprising:
determining each of the sub-band signals based on the first radar signal and the second signal;
obtaining a third signal by processing each of the sub-band signals in a frequency domain;
aggregating each of the sub-band signals based on the third signals; and
generating a correlation output in a time domain based on the aggregated each of the sub-band signals.

18. The method of claim 17, wherein:
each of the sub-band signals is accumulated over a time for detection using an amplitude or an amplitude square and a post-processing to remove artefacts; and
the correlation output is stored in a memory.

19. The method of claim 11, wherein the time-frequency radar waveform is an OFDM, a filter bank multi-carrier (FBMC), or a DFT pre-coded single carrier waveform.

20. The method of claim 11, further comprising transmitting and receiving signals, via an antenna system, a transmitter, a receiver, and a communication processor operably connected to the transmitter, the receiver, and the antenna system, using at least one of optical systems, wireless communication protocols or wired communication protocols.

* * * * *